Sept. 9, 1958  W. E. CURRIE  2,851,597
SAW TOOTH GENERATORS
Filed March 11, 1955
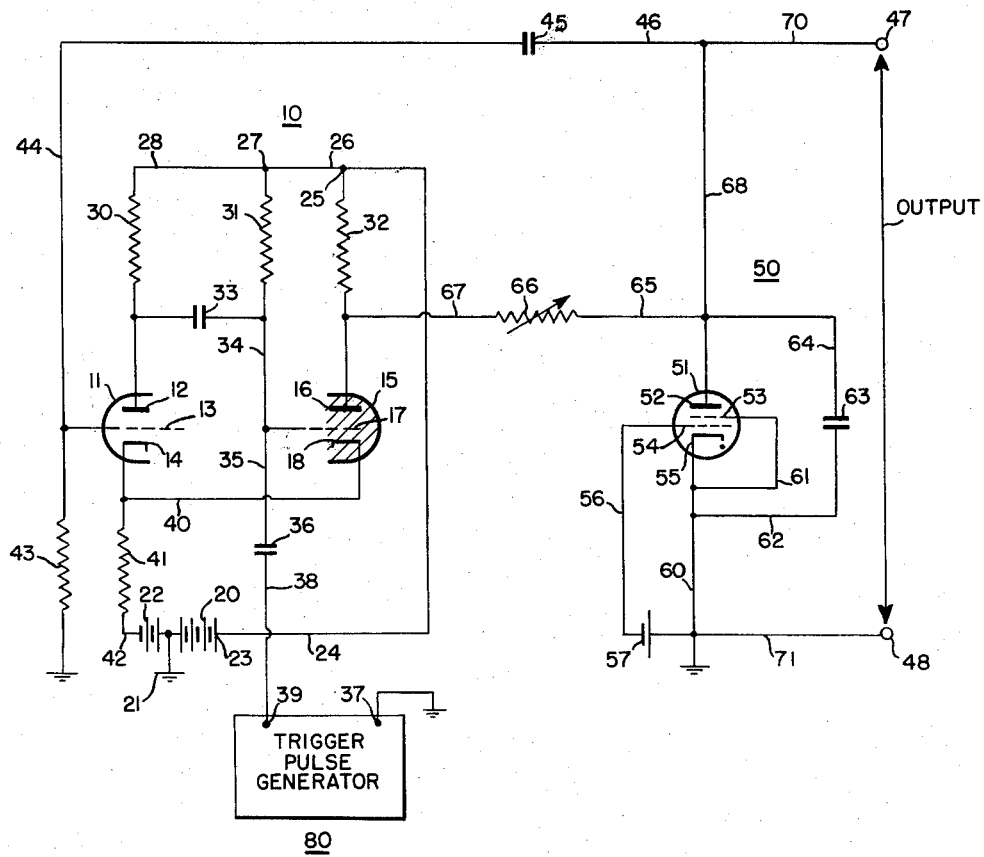
INVENTOR.
WILLIAM E. CURRIE
BY George W. Field
ATTORNEY 2,851,597
Patented Sept. 9, 1958

2,851,597
SAW TOOTH GENERATORS

William E. Currie, Seattle, Wash., assignor to Minneapolis-Honeywell Regulator Company, Minneapolis, Minn., a corporation of Delaware Application March 11, 1955, Serial No. 493,634

4 Claims. (Cl. 250—27)

This invention relates generally to saw tooth generators wherein a multivibrator is used to control a discharge device. It is more particularly related to a single sweep saw tooth generator in which the sweep returns instantly to the starting potential and the resting voltage between sweeps is at a constant low value.

It is desirable to maintain operation in a saw tooth generator at a condition at which the voltage of the sweep returns instantly to a constant lower value instead of waiting for the sluggish fly back associated with a multivibrator as previously employed. In cathode ray tube applications, for instance, it is desirable, in order to reduce the need for heavy retrace blanking, to have a saw tooth generator in which the resting voltage is at a constant low value.

It is therefore an object of the present invention to provide a sweep which returns instantly to the starting potential.

It is a further object of the present invention to provide a saw tooth generator wherein the saw tooth wave rests at the starting potential between sweeps.

A more detailed description of a preferred embodiment of my invention which I have shown schematically in the attached drawing follows:

Referring now to the drawing, I have shown a multivibrator 10, a trigger pulse generator 80, and a gaseous discharge device 50, connected in circuit to form a saw tooth generator.

Multivibrator 10 comprises current controlling devices 11 and 15. Current controlling device 11 is shown in the form of a triode having an anode 12, a control electrode 13, and a cathode 14, control electrode 13 and cathode 14 form a pair of input terminals and anode 12 and cathode 14 form a pair of output terminals. Current controlling device 15 is shown in the form of a triode having anode 16, control electrode 17, and cathode 18, control electrode 17 and cathode 18 form a pair of input terminals, an anode 16 and cathode 18 form a pair of output terminals. A battery 20 provides a source of power for multivibrator 10 and comprises a positive terminal 23, a negative terminal 22 and a ground intermediate terminal 21. Triode 15 is energized from battery 20 through positive terminal 23, lead 24, terminal 25, resistor 32, anode 16, cathode 18, lead 40, resistor 41, lead 42, and negative terminal 22. A positive potential is impressed on the control electrode of triode 15 from positive terminal 23, through lead 24, terminal 25, lead 26, terminal 27, resistor 31, and lead 34. Triode 11 is energized from battery 20 through terminal 23, lead 24, terminal 25, lead 26, terminal 27, lead 28, resistor 30, anode 12, cathode 14, resistor 41, lead 42, and negative terminal 22. Anode 12 of triode 11 is connected to control electrode 17 of triode 15, through capacitor 33 and lead 34. Cathode 14 of triode 11 and cathode 18 of triode 15 are connected together through lead 40.

Trigger pulse generator 80 is connected to control electrode 17 of triode 15 through terminal 39, lead 38, capacitor 36, lead 35, control electrode 17, cathode 18, lead 40, resistor 41, lead 42, negative terminal 22, battery 20, intermediate ground terminal 21 and ground terminal 37. Trigger pulse generator 80 is adapted to supply a negative trigger pulse.

Gaseous discharge device 50 comprises gaseous discharge tube 51 having an anode 52, a screen electrode 53, a control electrode 54, and a cathode 55. It is to be understood, however, that while I have shown a gaseous discharge tube, any device which changes from a high impedance to a low impedance when a certain voltage is impressed across it may be used. Screen electrode 53 of gaseous discharge tube 51 is connected to cathode 55 through lead 61. Anode 52 of gaseous discharge tube 51 is connected to cathode 55 through a capacitor 63 by leads 62 and 64. A source of negative potential shown as battery 57 is provided to bias control electrode 54 negatively with respect to cathode 55 through leads 56 and 58. Cathode 55 is connected to ground through lead 60. The output of triode 15 is connected to the anode of gaseous discharge tube 51 through lead 67, variable resistor 66, and lead 65. Anode 52 of gaseous discharge device 51 is connected to control electrode 13 of triode 11 through lead 68, lead 46, capacitor 45, lead 44. Control electrode 13 of triode 11 is connected to ground through resistor 43.

A pair of output terminals 47 and 48 are shown connected to anode 52 of gaseous discharge tube 51 through lead 70 and lead 68 and to cathode 55 of gaseous discharge tube 51 through lead 71 and lead 60.

| Reference character: | Value |
| --- | --- |
| 11 | ½ 6SN7 type tube. |
| 15 | ½ 6SN7 type tube. |
| 30 | 33,000 ohms. |
| 31 | 5,000,000 ohms. |
| 32 | 22,000 ohms. |
| 33 | 0.1 microfarads. |
| 36 | 0.0001 microfarads. |
| 41 | 6,800 ohms. |
| 43 | 100,000 ohms. |
| 45 | 0.0005 microfarads. |
| 51 | 2D21 type tube. |
| 63 | 0.1 microfarads. |
| 66 | 1,000,000 ohms. |

Operation

With no trigger pulse supplied to multivibrator 10, triode 15 is conductive and triode 11 is nonconductive. This is the normal operating condition of multivibrator 10 and follows from the fact that control electrode 17 of triode 15 is connected to a source of positive potential, and when triode 15 is conducting the current flow through resistor 41 is such as to reduce the negative potential supplied to cathode 14 of triode 11 thereby maintaining cathode 14 at a positive potential and effectively preventing triode 11 from conducting. In this normal operating condition the voltage appearing at anode 16 of triode 15 is at a very low value and gaseous discharge tube 51 will be nonconductive.

In order to produce a saw tooth sweep at output terminals 47 and 48 a negative trigger pulse is supplied from trigger pulse generator 80 through terminal 39, lead 38, capacitor 36, and lead 35, to control electrode 17 for triode 15. This tends to make triode 15 less conductive with the effect that the voltage developed across resistor 41 becomes less, allowing cathode 14 of triode 11 to become more negative with respect to anode 12. This in turn causes a negative pulse to be applied to control electrode 17 of triode 15 through capacitor 33, and lead 34, further reducing the conductivity of triode 15 until triode 15 becomes nonconductive and triode 11 becomes conductive. When triode 15 becomes nonconductive the voltage appearing at anode 16 of triode 15 rises, and is impressed across capacitor 63 through lead 67, variable resistor 66, lead 65, lead 64. The voltage appearing at anode 52 of gaseous discharge tube 51 will gradually rise, dependent on the timing circuit comprised of variable resistor 66 and capacitor 63, to a point where gaseous discharge tube 51 becomes conductive. This allows capacitor 63 to discharge. At the instant gaseous discharge tube 51 becomes conductive a negative pulse is applied to control electrode 13 of triode 11 through lead 68, lead 46, capacitor 45, and lead 44. This is sufficient to reduce conduction of triode 11 with the result that through the action inherent in a multivibrator, triode 11 instantaneously becomes nonconductive and triode 15 becomes conductive and the multivibrator has returned to its normal operating condition.

It is to be understood that modifications may be made in the design and arrangements of the parts without departing from the spirit of the invention.

What is claimed is:

1. Saw tooth wave generating apparatus comprising; a gaseous discharge device having at least an anode, a cathode and a control electrode, said anode and cathode forming a pair of output terminals; means for maintaining said control electrode at a negative potential with respect to said cathode; first capacitor means connected between said anode and said cathode; first and second current controlling devices each having input and output terminals, means interconnecting said first and second current controlling devices so as to form a multivibrator wherein said first current controlling device is normally nonconducting and said second current controlling device is normally conducting; means for supplying a signal to said input terminals of said second device to cause it to cease conducting and thereby cause said first device to commence conducting; resistance means connecting the output terminals of said second current controlling device to the anode and cathode of said gaseous discharge device, to energize said gaseous discharge device; and second capacitor means connecting the anode of said gaseous discharge device to the input terminal of said first device so as to restore normal conductivity to said first and second current controlling devices.

2. Saw tooth wave generating apparatus comprising; a discharge device; first capacitor means connected in parallel with said discharge device; first and second current controlling devices each having input and output terminals, means interconnecting said first and second current controlling devices so as to form a multivibrator wherein said first current controlling device is normally nonconducting and said second current controlling device is normally conducting, and means supplying a signal to the input terminals of said second device to cause it to cease conducting and thereby cause said first device to start conducting; resistance means connecting the output terminals of said second current controlling device to said first capacitor; second capacitor means connecting said first capacitor means to the input terminal of said first current controlling device; and output terminals, connected across said first capacitor means, and adapted for further connection to an impulse utilization device.

3. An electrical circuit for generating a periodic pulse in response to a signal source comprising; a signal source; first and second current controlling devices each having input and output terminals; means interconnecting said current controlling devices so as to normally allow said second current controlling device to be conductive and said first current controlling device to be nonconductive; means energizing said current controlling devices; means connecting said signal source to the input terminals of said second current conducting device so as to reverse the conductivity of said first and second current controlling devices; first capacitor means; resistance means connecting said first capacitor means in circuit across the output terminals of said second current controlling means, said resistance means and said first capacitor means comprising a timing circuit; a device connected in parallel with said first capacitor adapted to discharge said first capacitor means when the potential across said first capacitor means reaches a predetermined value; second capacitor means connecting said first capacitor means to the input terminals of said first current controlling device so as to restore said first and said second current controlling device to the normal operating condition; and output terminals connected to said first capacitor means, said output terminal having impressed thereon a saw-tooth voltage, the peaks of which correspond to said predetermined value at which said first capacitor means is discharged.

4. Saw tooth generating apparatus comprising; multivibrator means including first and second current controlling devices each having output and input terminals, means interconnecting said current controlling devices in circuit so that said first current controlling device is normally nonconductive and said second current controlling device is normally conductive, and pulsing means connected to the input terminals of said second current controlling device, adapted to reverse the conductivity of said first and second current controlling devices; first capacitor means; a device connected in parallel with said first capacitor means and adapted to discharge said first capacitor means when the potential across said first capacitor means rises to a predetermined value; resistance means connecting said first capacitor means to the output terminals of said second current controlling device so as to impress a potential across said first capacitor means, said resistance and said first capacitor means also forming a timing circuit; second capacitor means connecting said first capacitor means to the input terminals of said first current controlling device so as to restore said first and second current controlling devices to their first or normal operating condition; and output terminals connected to the terminals of said first capacitor means, said output terminals having impressed thereon a saw tooth voltage, the peaks of which correspond to said predetermined potential value at which said first capacitor means is discharged.

References Cited in the file of this patent

UNITED STATES PATENTS

| | | |
|---|---|---|
| 2,265,290 | Knick | Dec. 9, 1941 |
| 2,414,486 | Rieke | Jan. 21, 1947 |
| 2,452,549 | Cleeton | Nov. 2, 1948 |
| 2,562,188 | Hance | July 31, 1951 |
| 2,576,339 | Gray | Nov. 27, 1951 |